(12) United States Patent
Kondo

(10) Patent No.: US 6,209,528 B1
(45) Date of Patent: Apr. 3, 2001

(54) FUEL SUPPLY SYSTEM FOR AUTOMOTIVE ENGINES

(75) Inventor: Toyoshi Kondo, Tokyo (JP)

(73) Assignee: Tatsumi Corporation, Tokyo (JP)

( * ) Notice: Subject to any disclaimer, the term of this patent is extended or adjusted under 35 U.S.C. 154(b) by 0 days.

(21) Appl. No.: 09/108,385

(22) Filed: Jul. 1, 1998

(51) Int. Cl.[7] .................................................... F02B 33/00
(52) U.S. Cl. ............................................. 123/565; 60/608
(58) Field of Search ................................ 123/559.1, 565, 123/472, 478, 480, 492, 493; 60/608

(56) References Cited

U.S. PATENT DOCUMENTS

| 4,492,203 | * | 1/1985 | Yutaka | 123/478 |
| 4,873,961 | * | 10/1989 | Tanaka | 123/564 |
| 4,894,991 | * | 1/1990 | Kawamura | 60/608 |
| 5,125,235 | * | 6/1992 | Yanagihara et al. | 60/605.1 |

FOREIGN PATENT DOCUMENTS

03115751A  *  5/1991  (JP).

OTHER PUBLICATIONS

PTO–West abstract and image for JP62131945A Jun. 1987.*
PTO–West abstract and image for JP61250351A Nov. 1986.*
PTO–West abstract for JP405171981A Jul. 1993.*

* cited by examiner

Primary Examiner—Henry C. Yuen
Assistant Examiner—Mahmoud M. Gimie
(74) Attorney, Agent, or Firm—Jacobson, Price, Holman & Stern, PLLC

(57) ABSTRACT

A fuel supply system for an automotive engine is provided in which fuel is injected from fuel injectors (31a to 31d) into the air that is drawn into the engine (30) through an intake passage (120) to produce a mixture of fuel and air; a microswitch (80) detects that the opening angle of a throttle valve (60) is equal to or greater than a predetermined opening angle, and then outputs a detection signal; a drive motor (110) is operated by a motor control circuit (90) on the basis of the output signal of an air flow sensor (20); and the air drawn into the intake passage (120) is compressed by an axial flow turbo fan (107) driven with the drive motor (110) and is supplied to the engine (30).

4 Claims, 12 Drawing Sheets

- - - - - PRIOR ART
———— PRESENT INVENTION
FUEL SUPPLY SYSTEM FOR AUTOMOTIVE ENGINES

BACKGROUND OF THE INVENTION

1. Field of the Invention

The present invention relates to a fuel supply system for automotive engines that can achieve enhancements in fuel economy and harmful exhaust gas purification.

2. Description of the Related Art

Engines for automobiles can be classified into a gasoline engine using gasoline, a diesel engine using diesel oil, and so on. The fuel supply system for supplying fuel to such automotive engines is shown, for example, in FIG. 1.

In FIG. 1, reference numeral 30 denotes a four-cylinder engine. The combustion chambers of four cylinders (not shown) of the engine 30 have four branch pipes of an intake manifold (not shown) connected thereto, respectively.

To this intake manifold (intake side) an air filter 10 is connected through an air flow sensor 20, an air hose 40, and a throttle valve 60. This throttle value 60 is opened or closed by an accelerator pedal 50.

Also, in the branch pipes of the intake manifold or the combustion chambers of the cylinders of the engine 30, injection nozzles 31 are provided so that fuel can be injected into the branch pipes or combustion chambers. Moreover, an output signal from the air flow sensor 20 is input to a microcomputer 70. Based on the output signal from the air flow sensor 20, the microcomputer 70 increase or decrease a quantity of fuel which is injected from the injection nozzles 31 in correspondence to an increase or decrease in the quantity of air which is drawn in.

Therefore, in a fuel supply system such as this, if the engine 30 is operated, then negative intake pressure will be produced within the intake manifold (not shown) through the combustion chambers. With this negative intake pressure, the air in the atmosphere is drawn into the air hose 40 through the air filter 10. When this occurs, the dust and the like contained in the air are collected with the air filter 10, and the air being passed through the air filter 10 is purified. This purified air is drawn into the combustion chambers of the cylinders of the engine 30 through the air flow sensor 20, air hose 40, throttle valve 60, and the intake manifold (not shown). On the other hand, fuel is injected from the injection nozzles 31 into the four branch pipes of the intake manifold (not shown) or the combustion chambers. This fuel is mixed with the air which is supplied to the engine 30. And after this fuel-air mixture has burned within the combustion chambers, it is exhausted into the atmosphere.

Also, if the throttle opening angle of the throttle valve 60 is increased or decreased by the operation of stepping on the accelerator pedal 50, the quantity of air which is drawn in through the air filter 10 will be increased or decreased and therefore the quantity of fuel-air mixture which is produced at the throttle valve 60 will be increased or decreased. At the same time, the quantity of fuel which is injected from the injection nozzles 31 to the four branch pipes of the intake manifold (not shown) is increased or decreased, so that the output of the engine 30 is increased or decreased.

To increase the output of the engine suddenly in the above-mentioned fuel supply system, the driver can step on the accelerator pedal 50 considerably to increase the throttle opening angle of the throttle valve 60.

However, in the early stage of this operation of stepping on the accelerator pedal 50, a phenomenon in which the gases in the engine 30 flow backward occurs. In this case, although the air intake quantity is reduced, the quantity of fuel injected from the fuel injection nozzle 31 is increased, so that the rich fuel-air mixture is drawn into the combustion chambers of the engine 30 and is not completely burned. As a consequence, in the early stage of the operation of stepping on the accelerator pedal 50 deeply, exhaust gases, such as carbon monoxide and hydrocarbon, harmful to the atmospheric environment or human body are exhausted form the engine 30 into the atmosphere and result in the primary causes of environmental pollution. Furthermore, there is a problem in that the engine output efficiency falls and therefore the operational performance of the automobile is reduced.

An air oversupplying device, such as a turbocharger or a supercharger, has been proposed as a means for resolving this problem. In the turbocharger, an air compressor is driven with a turbine revolved by exhaust gases so as to supply an above-normal quantity of air to an engine. In the supercharger, an above-normal quantity of air is supplied to an engine by the use of an air compressor coupled to an output shaft of the engine.

However, since this type of air oversupplying means is not constructed to be afterward provided in an engine completed as a single product, it is difficult to easily equip a conventional automobile with the air oversupplying means.

Further, since the air oversupplying means is operated using the exhaust gas discharged from an engine and the drive force generated by the engine, the engine is always under a load. As a result, it is necessary to set the revolution speed of the engine at a somewhat high value, in order to prevent the engine from stopping during idling. However, in the case where an automobile stops frequently at intersections or in traffic jams, an excessive quantity of fuel corresponding to the increased revolution speed of the engine during idling is consumed. This is undesirable in fuel economy.

Further, as mentioned above, since the air oversupplying means is operated using the exhaust has discharged from the engine or the driving force generated thereby, the quantity of air to be supplied to the engine cannot necessarily be precisely controlled according to the revolution speed of the engine.

SUMMARY OF THE INVENTION

The present invention has been made in order to solve the above-mentioned problems of the prior art. Accordingly, it is a first object of the present invention to provide a fuel supply system for automotive engines which is capable of producing a completely combustible mixture of fuel and air so that fuel economy and engine efficiency can be enhanced and also exhaust gases harmful to the atmospheric environment and human body can be purified, by injecting the quantity of fuel which corresponds to the intake air quantity of the engine during the acceleration and low speed of the automobile.

It is a second object of the present invention to provide a fuel supply system for automotive engines which can be easily equipped in a conventional automobile.

It is a third object of the present invention to provide a fuel supply system for automotive engines which is capable of precisely controlling the quantity of air to be supplied to the engine in accordance with an engine revolution speed.

In order to achieve the first and second objects, there is provided a fuel supply system for an automotive engine which comprises an intake passage for drawing the air in the atmosphere and guiding it to an intake side of the engine; an air flow detecting means for detecting a quantity of the air which is drawn into the intake passage; a turbo means for compressing the air drawn into the intake passage and supplying the compressed air to the engine; a throttle valve arranged in the way of the intake passage; fuel injectors for injecting fuel into the air which is supplied to the engine through the throttle valve; a fuel injection control means for increasing or decreasing a quantity of the fuel which is injected from the fuel injectors in accordance with an increase or decrease in the flow rate of the air which is drawn into the intake passage, based on an output signal from the air flow sensor; a drive motor for driving the turbo means; a valve operation detecting means of detecting the operation of the throttle valve when the opening angle thereof is equal to or greater than a predetermined value and also outputting a detection signal; and a motor control means for driving and controlling the drive motor in response to the detection signal from the valve operation detecting means.

The motor control means may drive and control the drive motor to maintain a fixed revolution speed while the motor control means is receiving a detection signal from the valve operation detecting means. Further, the valve operation detecting means may be a microswitch for detecting the depressing operation of an accelerator pedal which is in conjunction with the throttle valve. Further, the valve operation detecting means may be an opening angle detecting sensor for detecting the opening angle of the throttle valve. Further, the valve operation detecting means may be a negative pressure detecting sensor for detecting the negative intake pressure of the engine.

In order to achieve the third object of the present invention, the valve operation detecting means may be an opening angle detecting sensor for detecting the opening angle of the throttle valve, and the motor control means may increase or decrease the revolution speed of the drive motor in accordance with an increase or decrease in the opening angle of the throttle valve, based on the detection signal from the opening angle detecting sensor when a detection signal from the opening angle detecting sensor is equal to or greater than a predetermined value.

Further, in order to achieve the third object of the present invention, the valve operation detecting means may be a negative pressure detecting sensor for detecting the negative intake pressure of the engine, and the motor control means may increase or decrease the revolution speed of the drive motor in accordance with an increase or decrease in the absolute value of the negative intake pressure, based on the detection signal from the negative pressure detecting sensor when a detection signal from the negative pressure detecting sensor is equal to or greater than a predetermined value.

Further, in order to achieve the third object of the present invention, the motor control means may increase or decrease the revolution speed of the drive motor in accordance with an increase or decrease in the air intake quantity, based on a detection signal of the air flow detecting means while the valve operation detecting means is detecting the operation of the throttle valve.

Further, the turbo means may be an axial flow turbo fan provided with rotary vanes for production of a vortex flow. The rotary vanes of the axial flow turbo fan can be provided so that each vane is set at an angle of 15° to 30° to an axis of the axial flow turbo fan, in order to increase air pressure while producing a vortex flow, and prevent the air from flowing backwards from the engine.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Preferred embodiments of the present invention will hereinafter be described based on FIGS. 2 through 13(b).

Mechanical Construction

Figure 1:
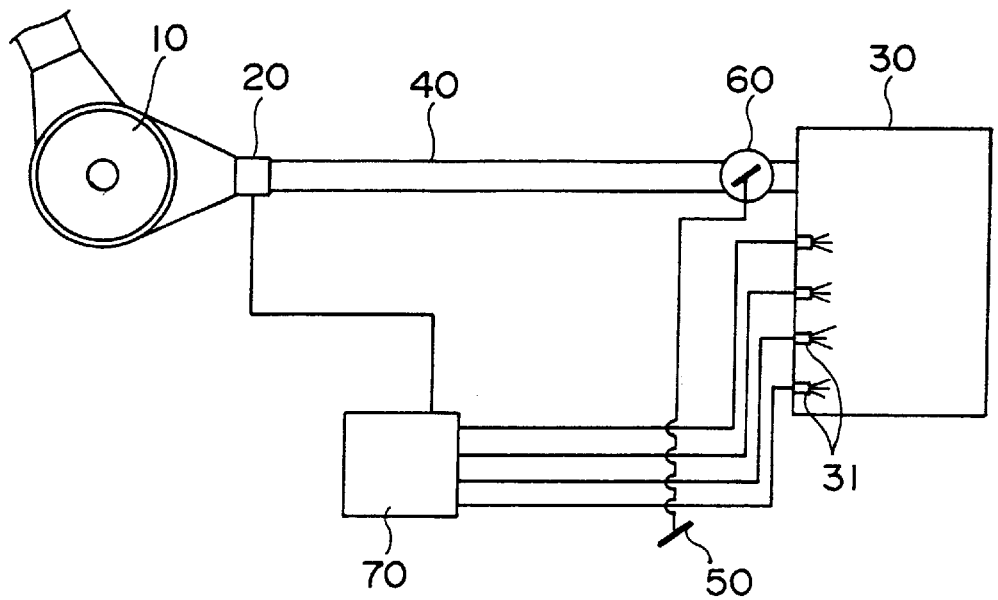
FIG. 1 is a schematic view showing a conventional air supply and mixture combustion process used in automobiles.
Figure 2:
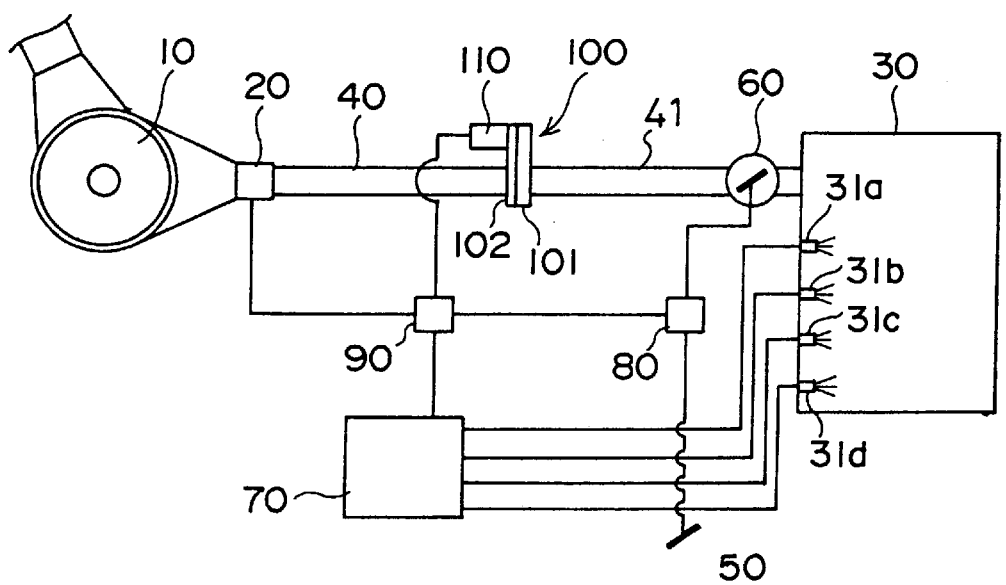
FIG. 2 is a schematic explanatory diagram showing a fuel supply system for automobile engines according to the present invention.

In FIG. 2, reference numeral 10 is an air filter (air cleaner), reference numeral 20 is an air flow sensor (air-flow detecting means), reference numeral 30 is an engine, reference numerals 31a to 31d are fuel injectors (fuel injector nozzles), reference numerals 40 ad 41 are air hoses, reference numeral 50 is an accelerator pedal, reference numeral 60 is a throttle valve, reference numeral 70 is a microcontroller as a fuel injection control circuit (fuel injection control means), reference numeral 80 is a microswitch (valve operation detecting means) which is turned on or off by the accelerator pedal 50, reference numeral 90 is a motor control circuit (motor control means) with a microcomputer, and reference numeral 100 is a motor driven type turbocharger (air supercharging means).

Figure 3:
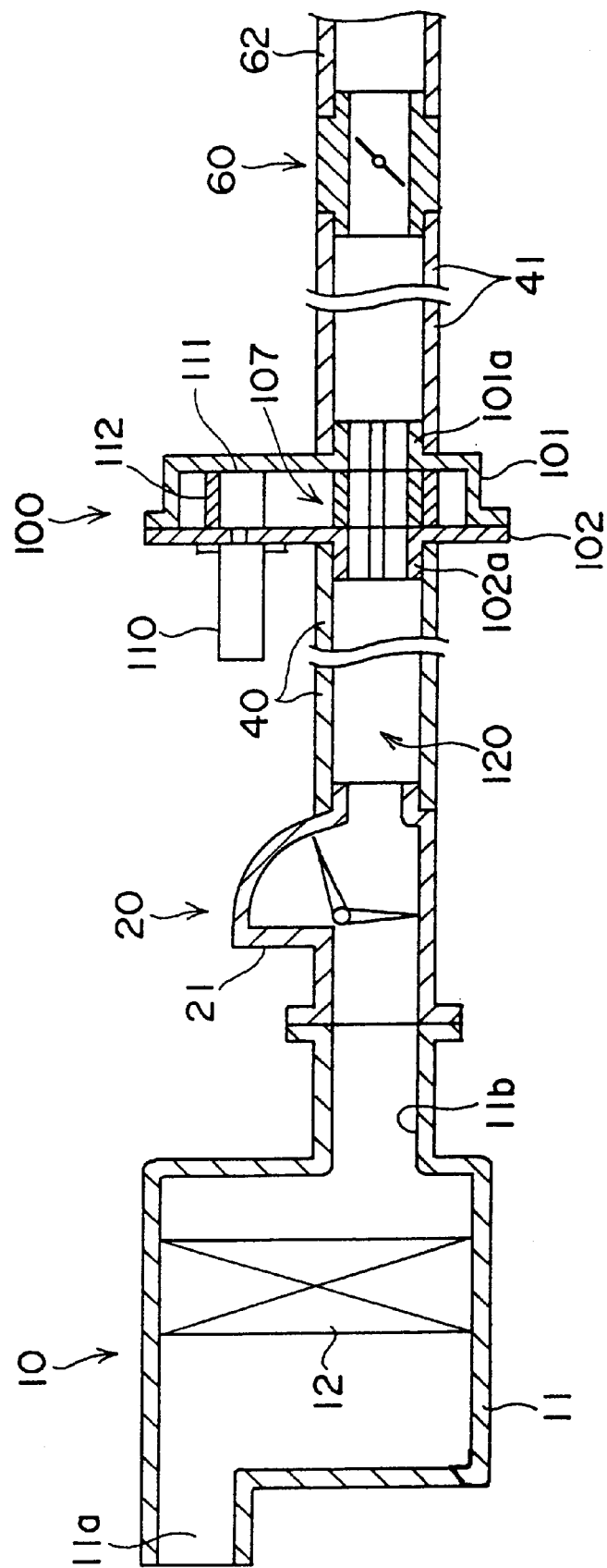
FIG. 3 is a longitudinal sectional view sowing the air intake passage of the fuel supply system shown in FIG. 2.

The air filter 10, as shown in FIG. 3, has a filter retainer 11 and a filtering member 12 arranged within the filter retainer 11. This filter retainer 11 has an air inlet port 11a and an air outlet port 11b. This air output port 11b is connected to the upstream air hose 40 through the casing 21 of the air flow sensor 20.

Figure 5A:
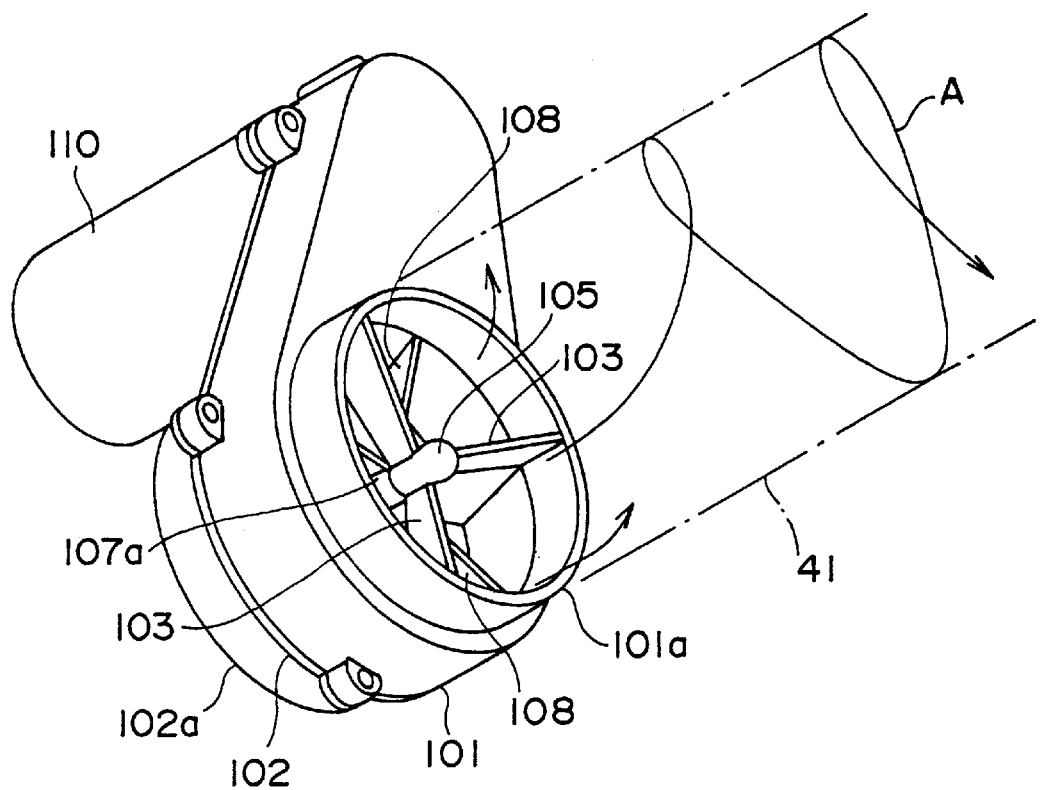
FIG. 5(a) is a perspective view of the turbocharger shown in FIGS. 2 and 3.
Figure 6:
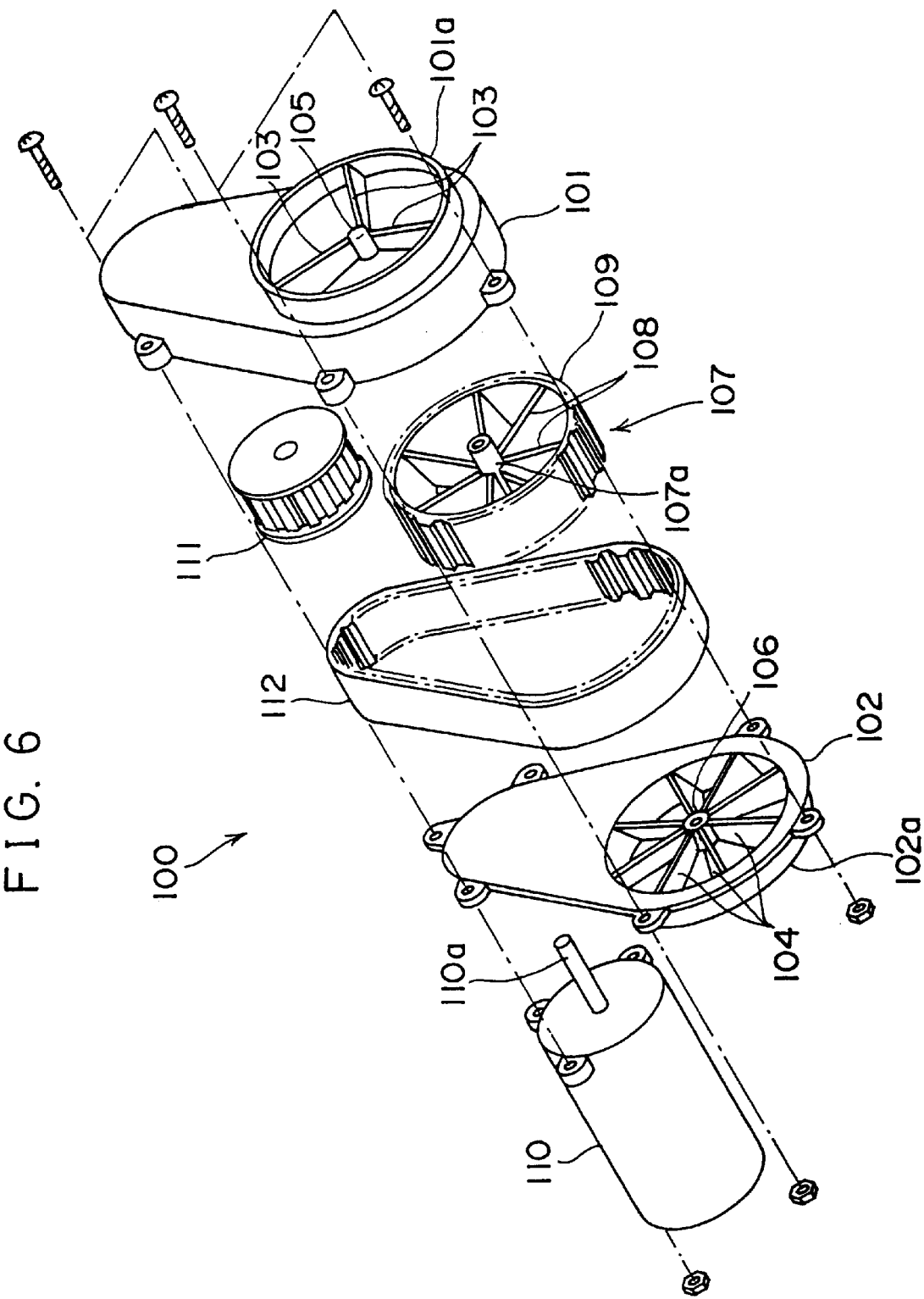
FIG. 6 is an exploded perspective view of the turbocharger shown in FIGS. 2 and 3.

Between the upstream air hose 40 and the downstream air base 41 the turbocharger 100 is interposed. The turbocharger 100 as a motor driven type air compression-supply device, as shown in FIGS. 3, 5(a), and 6, has a long and narrow, flat casing 101 and a cover body 102 whereby the opened end of the casing 101 is closed. The casing 101 and the cover body 102 are formed with a downstream cylindrical portion 101a and an upstream cylindrical portion 102a at their longitudinal (axial) ends, respectively. The downstream and upstream cylindrical portions 101a and 102a protrude from the casing 101 and cover body 102 in opposite directions and are provided coaxially.

The downstream cylindrical portion 101a is provided integrally with a plurality of rectifying plates (stationary vanes) 103 extending in the radial direction, while the upstream cylindrical portion 102a is provided integrally with a plurality of rectifying plates (stationary vanes) 104 extending in the radial direction. Furthermore, each rectifying plate 103 extends in the axial direction along the axis O of the downstream cylindrical portion 101a and is inclined at an angle α to the axis O of the cylindrical portion 101a. Likewise, each rectifying plate 104 extends in the axial direction along the axis O of the upstream cylindrical portion 102a and is inclined at an angle β to the axis O of the cylindrical portion 102a. Also, the center portion of the plurality of rectifying plates 103 is provided integrally with a boss portion 105, and the center portion of the plurality of rectifying plates 104 is provided integrally with a boss portion 106.

Figure 5B:
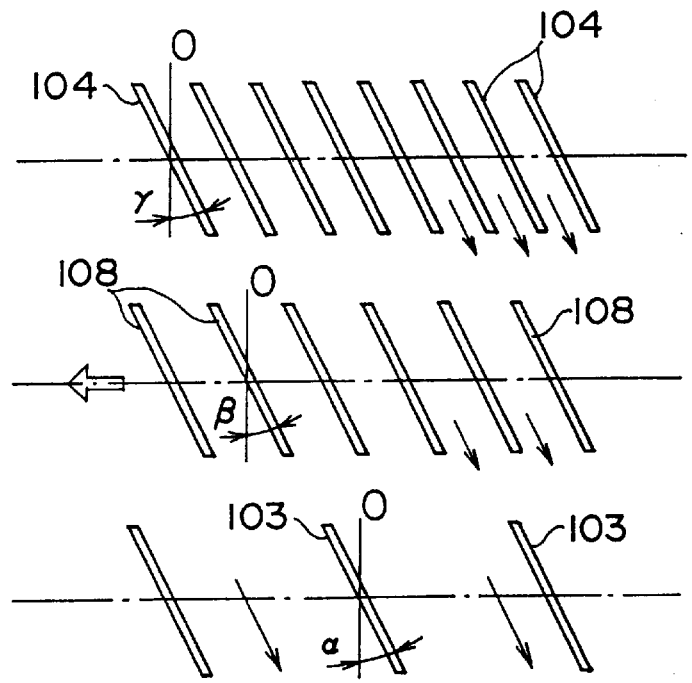
FIG. 5(b) is a development view showing the angles of stationary plates and turbo vanes shown in FIG. 6.

Between these cylindrical portions 101a and 102a an axial flow turbo fan (turbo means) 107 is interposed for air compression. This axial flow turbo fan 107 has a boss portion 107a held freely rotably on a support shaft (not shown) held on the boss portions 105 and 106, a plurality of turbo vanes (rotary vanes) 108 extending form the boss portion 107a in the radial direction, and a cylindrical timing gear 109 provided so as to be concentric with the boss portion 107a and provided so as to be integral with the turbo vanes 108. In the turbo vanes 108, each plate surface extends in the axial direction along the axis O of the timing gear 109 (which is aligned with the axis of the boss portion 107a) and is also inclined by an angle β to this axis O. The inclination angles α, γ, and β of the rectifying plates 103 and 104 and turbo vanes 108 are set to 15° through 30° as shown in FIG. 5(b).

Also, a drive motor 110 is fixed to the exterior surface of the other end of the casing 101, and a timing gear 111 is interposed between the longitudinal other end portions of the casing 101 and cover body 102. This timing gear 111 is connected to the output shaft 110a of the drive motor 110. Moreover, a timing belt 112 is looped between the timing gears 109 and 111. Therefore, if the drive motor 110 is operated, the rotation of the output shaft 110a of the drive motor 110 will be transmitted to the axial flow turbo fan 107 through the timing gear 111 and timing belt 112 and therefore the axial flow turbo fan 107 will be driven to rotate. When this occurs, the axial flow turbo fan 107 compresses the air on the side of the upstream cylindrical portion 102a and discharges the compressed air to the side of the downstream cylindrical portion 101a.

Moreover at this time, the air on the side of the upstream cylindrical portion 102a flows in a spiral direction by operation of the rectifying plates 104 and is compressed and discharged by the intermediate turbo vanes 108f. This discharged air flows in a spiral direction (which is the same direction as the spiral flow produced by the rectifying plate 104) by operation of the rectifying plates 103 and becomes a vortex flow, thereby preventing a back flow of air.

The upstream cylindrical portion 102a of such a turbocharger 100 is connected to the upstream air hose 40, while the downstream cylindrical portion 101a is connected to the intake manifold 62 through the downstream air hose 41 and the casing 61 of the throttle valve 60. This intake manifold 62 has four branch pipes 62a to 62d ash shown in FIG. 4.

Figure 4A:
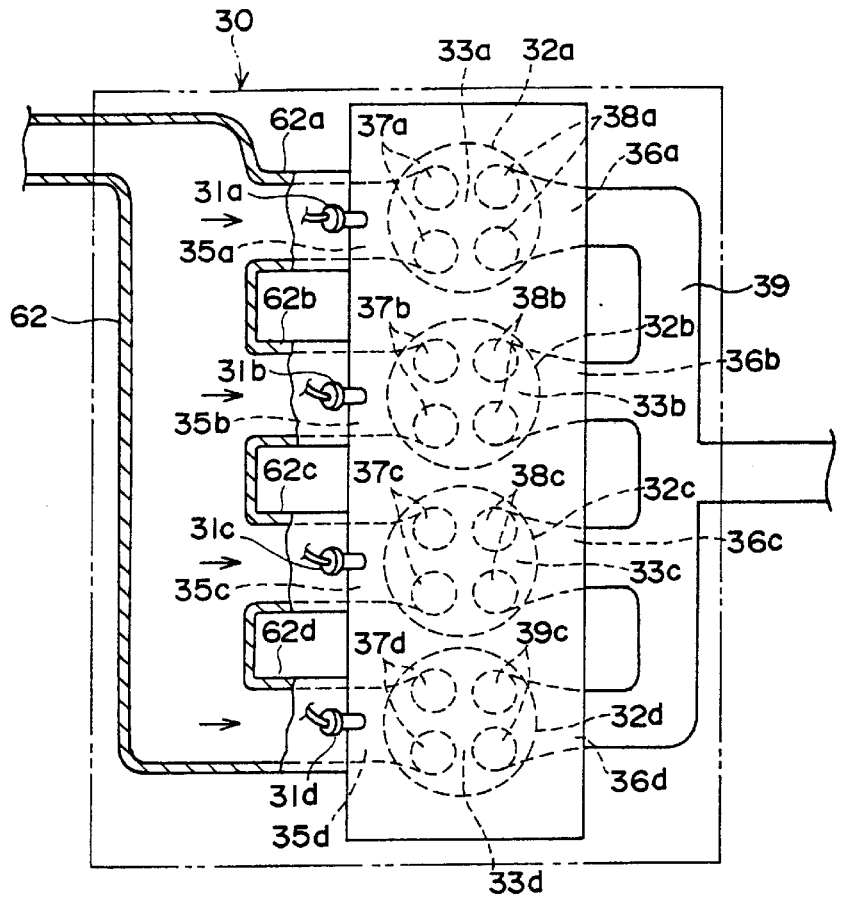
FIG. 4(a) is a horizontal sectional view showing the engine of FIG. 2.
Figure 4B:
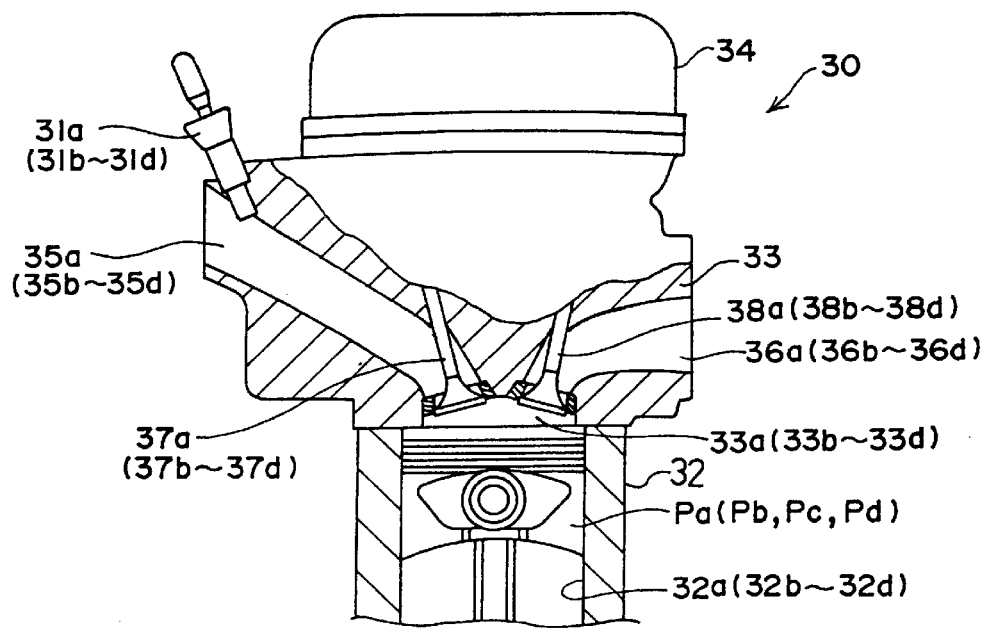
FIG. 4(b) is a side elevation view, partly cut away, showing the engine of FIG. 4(a)

The engine 30 has a cylinder main body 32, a cylinder head 33, and a head cover 34, as shown in FIG. 4(b). And the cylinder main body 32 is provided with four cylinders 32a and 32d and four portions Pa to Pd arranged within the cylinders 32a to 32d, four combustion chambers 33a to 33d, as shown in FIGS. 4(a) and 4(b). Also, the cylinder head 33 is formed with intake ports 35ato 35d and exhaust ports 36a to 36d. The intake ports 35a to 35d are communicated with the combustion chambers 33a to 33d through intake valves 37a to 37d, respectively. Similarly, the exhaust ports 36a to 36 d are communicated with the combustion chambers 33a to 33d through exhaust valves 38a to 38d, respectively.

The branch pipes 62a to 62d of the above-mentioned intake manifold 62 are connected to the intake ports 35a to 35d of the engine 30, respectively. On the other hand, the exhaust ports 38ato 38d are connected to an exhaust manifold 39. Also, the above-mentioned fuel injectors (fuel injection nozzles) 31a to 31d are attached to the cylinder head 33 so that they can inject fuel into the intake ports 35a to 35d. Note that the fuel injectors (fuel injection nozzles) 31ato 31d can also be attached to the branch pipes 62a to 62d of the intake manifold 62. Also, in the case of diesel engines, fuel is injected directly into the combustion chamber.

Control Circuit

The above-mentioned air flow sensor 20 adopts structure known in the prior art. Also, the microswitch 80 used as a valve operation detecting means is constructed so that it is turned on by the accelerator pedal 50, when the accelerator pedal 50 is depressed a predetermined quantity or beyond and also the opening angle of the throttle valve 60 has reached a predetermined value or greater. For example, the microswitch 80 is set to being an OFF state, according to the position of the accelerator pedal 50 when the opening angle of the throttle valve 60 is equal to or is slightly greater than the opening angle thereof maintained while idling.

For the structure for turning on the microswitch 80, for example, a cylindrical portion may be provided on the proximal portion of an accelerator lever (not show) integral with the accelerator pedal and supported freely rotatably on the vehicular body through a support shaft. Also, the cylindrical portion may be provided with a cam portion. With this cam portion, the microswitch 80 may be turned on. This cam portion may be constructed so that it continues to turn on the microswitch 80 while the accelerator pedal 50 has been depressed a predetermined quantity or beyond. For another structure for turning on the microswitch 80, the accelerator pedal 50 may be provided with a cam member which interlocks therewith by a wire, etc., and the cam member may continue to turn on the microswitch 80 while the accelerator pedal 50 has been depressed a predetermined quantity or beyond.

Figure 7:
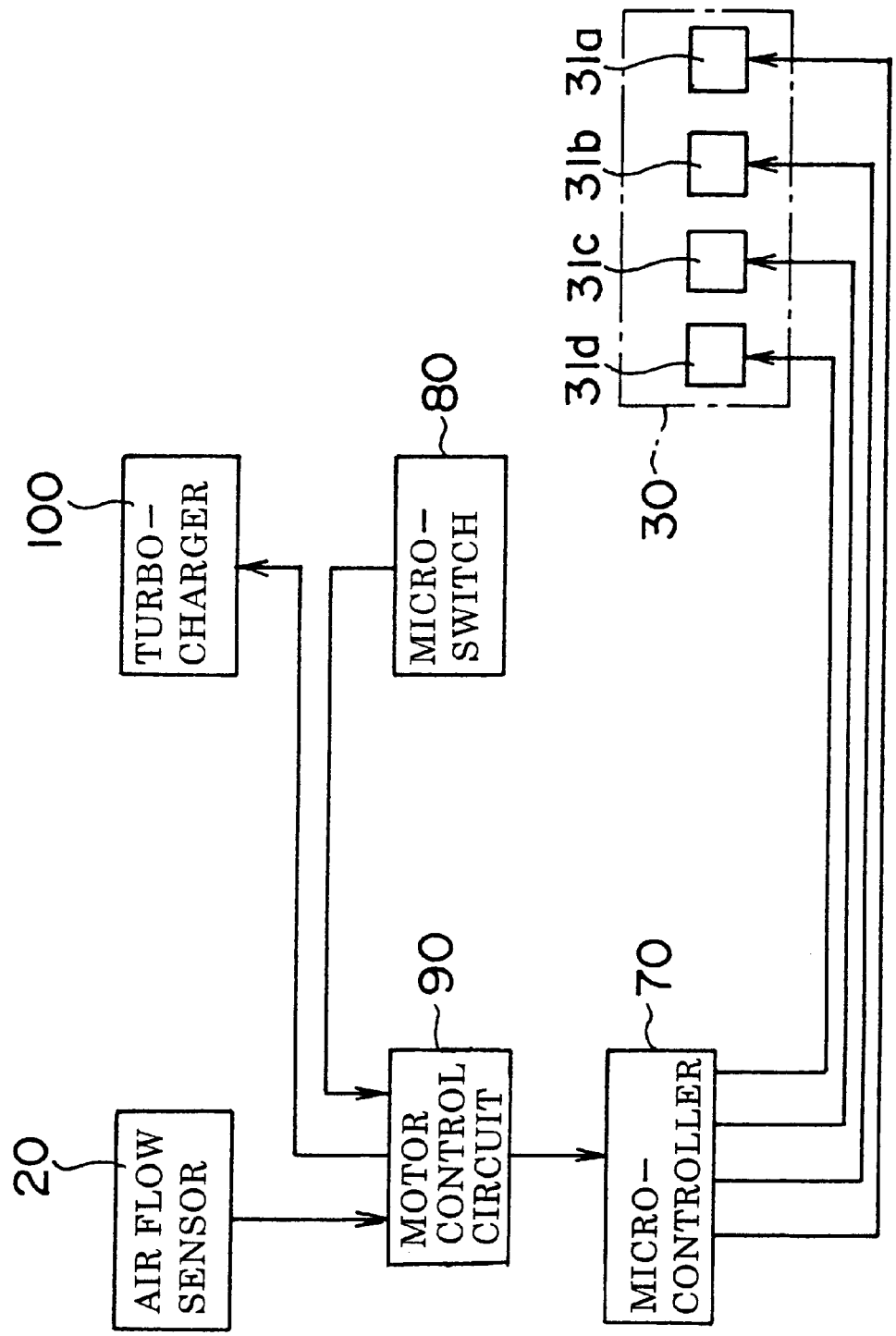
FIG. 7 is a block diagram showing the control circuit of the fuel supply system shown in FIG. 2.

The output signal from the air flow sensor 20 and the ON signal (detection signal) from the microswitch 80 are input to a motor control circuit 90 as shown in FIGS. 2 and 7. This motor control circuit 90 inputs the output signal of the air flow sensor 20 to the microcontroller 70. This motor control circuit 90 also operates the drive motor 110 when the microswitch 80 is turned on and, based on the output signal from the air flow sensor 20, increases or decreases rotation of the drive motor 110. Furthermore, the microcontroller 70 increases or decreases the quantity of fuel that is injected from the fuel injectors 31a to 31d to the intake ports 35a to 35d, based on the output signal from the air flow sensor 20.

Note that the passage from the air inlet port 11a of the above-mentioned air filter 10 to the intake ports 36a to 36d of the engine 30 constitutes an intake passsage 120 for drawing the outside air into the combustion chambers 33a to 33d of the engine 30.

Operation

Figure 8:
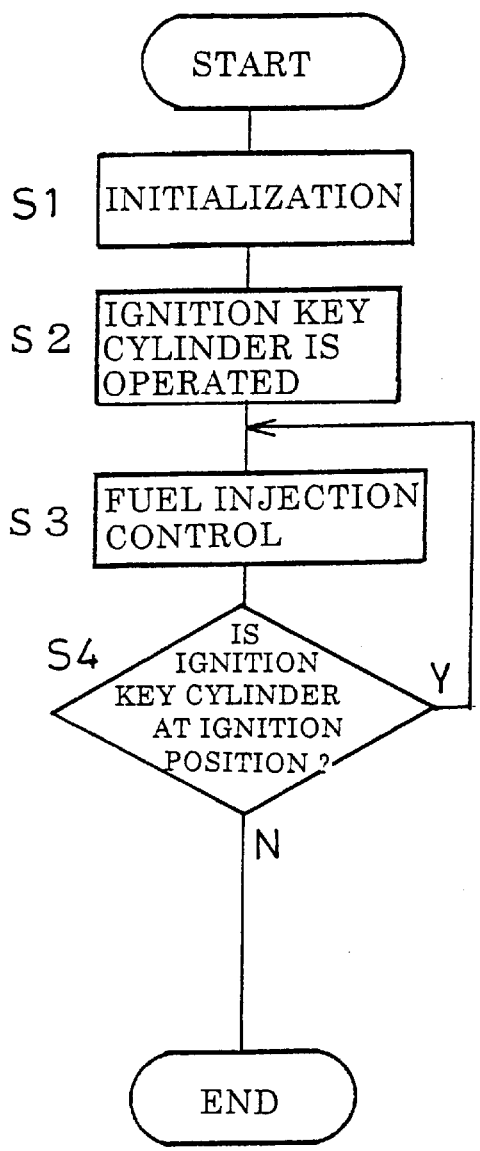
FIG. 8(A) is a flowchart of the control of fuel injection by the microcontroller.
FIG. 8(B) is a flowchart of the control of the turbocharger by the motor control circuit.
Figure 8:
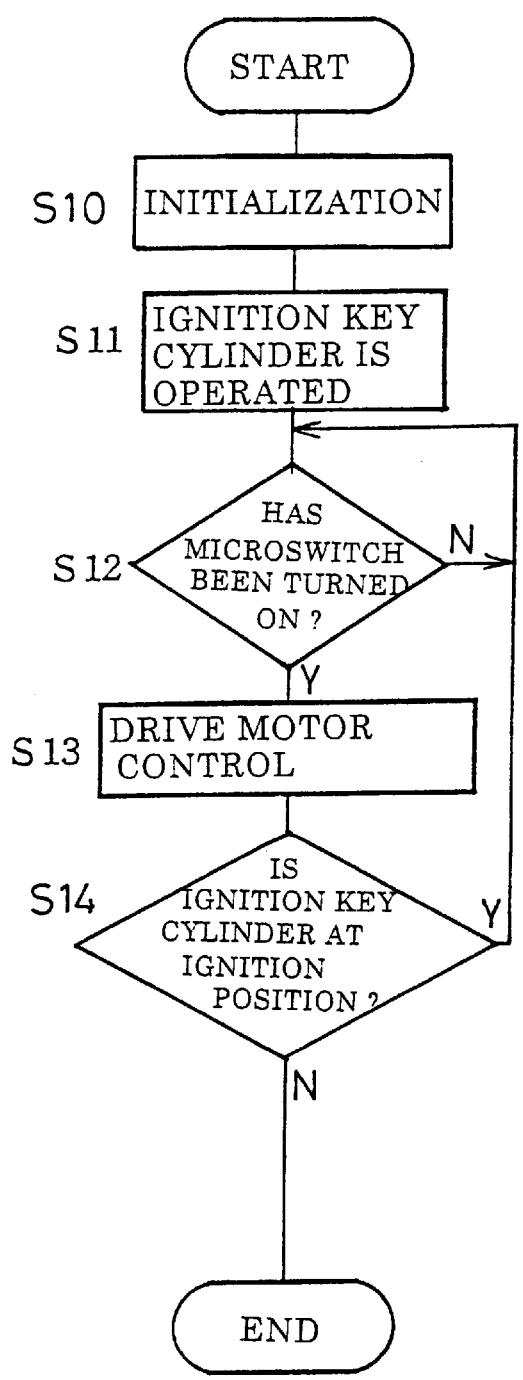

Now, the operation of the fuel system for automotive engines, constructed as described above, will be described primarily based on a flowchart shown in FIG. 8.

Individual Operations of Fuel Injectors 31a to 31d and Turbocharger 100

The ignition key cylinder (not shown) of the automobile has an OFF position, an accessory (ACC) position at which power to accessory parts is turned on, an ignition (IG) position at which the ignition circuit is turned on, a start position at which the starter is operated and causes the engine to operate, and so on. Since this constitution is known in the prior art, an illustration and detailed description thereof will not be given.

(i) Fuel Injection Control by Microcontroller 70

Step S1:

If the ignion key cylinder is operated and moved to the ACC position, the microcontroller 70 (which is the fuel injection control circuit) will be initialized and this step will advance to Step S2.

Step S2:

In this step the ignition key cylinder is operated and moved to the start position, thereby operating the starter and the engine 30. If the engine is operated, negative pressure will be produced in the intake passage 120 through the combustion chambers 33a tp 33d of the engine 30. This negative intake pressure causes the air in the atmosphere to be drawn input the intake ports 35a to 35d of the engine 30 through the intake passage 120. At this time, the microcontroller 70 makes the fuel injectors 31a to 31d inject fuel to the intake ports 35a to 35d, thereby producing a mixture of fuel and air at the intake ports 35a to 35d. Note that the are in the atmosphere drawn into the air filter 10 flows to the side of the air flow sensor 20 past the filtering member 12. When this occurs, the dust contained in the air is collected by the filtering member 12, and the air being passed through the filtering member 12 is purified.

The produced fuel-air mixture is also drawn into the combustion chambers 33a to 33d of the engine 30 and is ignited and burned by spark plugs (not shown). Note that after the fuel-air mixture has burned, it is exhausted into the atmosphere through the exhaust ports 36a to 36d, exhaust manifold 39, and the exhaust pipe (not shown). In this way, the engine 30 is operated. When this occurs, the air flow sensor 20 measures the flow rate of the air drawn into the intake passage 120 and then outputs as a measurement signal the signal corresponding to the air flow rate. This measurement signal is input to the motor control circuit 90 as the output signal of the air flow sensor 20. This output signal is also input to the microcontroller (fuel injection control circuit) 70 through the motor control circuit 90.

After the engine 30 has been operated, if the control force is released from the ignition key cylinder it will return from the start position to the IG position and this step will advance to step S3.

Step S3:

In this step, if the ignition key cylinder is returned to the IG position, the microcontroller 70 will increase or decrease the quantity of fuel which is injected from the fuel injectors 31a to 31d to the intake ports 36a to 36d on the basis of the output signal from the air flow sensor 20, and this step will advance to step S4. At this time, if the quantity of air, drawn into the intake passage 120 and measured with the air flow sensor 20, is increased or decreased, the quantity of fuel which is injected from the fuel injectors 31a to 31d to the intake ports 36a to 36d will be increased or decreased.

Step S4:

In this step it is judged whether or not the ignition key cylinder is at the ignition (IG) position. If it is at the IG position, this step will return to step S3. On the other hand, if it is not at that position, the fuel injection control will end.

(ii) Control of Turbocharger 100 by Motor Control Circuit 90

Step S10:

If the ignition key cylinder is operated and moved to the ACC position, in this step the motorcontrol circuit 90 will be initialized, and this step will advance to step S11.

Step S11:

In this step the ignition key cylinder is operated and moved to the start position, thereby operating the starter and the engine 30. If the engine is operated, negative pressure will be produced in the intake passage 120 through the combustion chambers 33a to 33d of the engine 30. This negative intake pressure causes the air in the atmosphere to be drawn into the intake ports 35a to 35i dof the engine 30 through the intake passage 120. When this occurs, the microcontroller 70, as described above, makes the fuel injectors 31a to 31d inject fuel into the intake ports 35a to 35d, thereby producing a mixture of fuel and air at the intake ports 35a to 35d. Note that the air in the atmosphere drawn into the air filter 10 flows to the side of the air flow sensor 20 past the filtering member 12. When this occurs, the dust contained in the air is collected by the filtering member 12, and the air being passed through the filtering member 12 is purified.

The produced fuel-air mixture is also drawn into the combustion chambers 33a to 33 d of the engine 30 and is ignited and burned by spark plugs (not shown). Note that after the fuel-air mixture has burned, it is exhausted into the atmopshere through the exhaust ports 36ato 36d, exhaust manifold 39, and the exhaust pipe (not shown). In this way, the engine 30 is operated.

When this occurs, the air flow sensor 20 measures the flow rate of the air drawn into the intake passage 120 and then outputs as a measurement signal the signal corresponding to the air flow rate. This measurement signal is input to the motor control circuit 90 as the output signal of the air flow sensor 20.

And after the engine 30 has been operated, if the control force is released from the ignition key cylinder, it will return from the start postion to the IG position and this step will advance to step S12.

Step S12:

In this step it is judged whether or not the accelerator pedal 50 has been depressed a predetermined quantity or beyond. That is, it is judged whether or not the accelerator pedal 50 has been depressed a predetermined quantity or beyond and thereby the microswitch 80 has been turned on. In this judgment, if the microswitch 80 has not been turned on, this step will be repeated. If it has been turned on, this step will advance to step S13. Note that the microswitch 80 is set to be in an OFF state, according to the position of the accelerator pedal 50 when the opening angle of the throttle valve 60 is equal or is slightly greater than the opening angle thereof maintained while idling.

Step S13:

In this step, since the opening angle of the throttle valve 60 has surpassed the value equal to or slightly greater than the opening angle thereof maintained during idling and thereby the microswitch 80 has been turned on, the drive motor 110 of the turbocharger 100 is operated and controlled by the motor control circuit 90 which is receiving the ON signal, and the output shaft 110a of the drive motor 110 is made to rotate. This rotation of the output shaft 110a of the drive motor 110 is transmitted to the axial flow turbo fan 107 through the timing gear 111 and the timing belt 112, whereby the axial turbo fan 107 is driven to rotate. With this, the axial turbo fan 107 compresses the air on the side of the upstream cylindrical portion 102a and discharges the compressed air to the side of the downstream cylindrical portion 101a.

When this occurs, the air on the side of the upstream cylindrical portion 102a flows in a spiral direction by operation of the rectifying plates 104 and is compressed and discharged by the intermediate turbo vanes 108. This discharged air flows in a spiral direction (which is the same direction as the spiral flow produced by the rectifying plates 104) by operation of the rectifying plates 103, and becomes a vortex flow as shown by arrow A in FIG. 5(a), thereby preventing a back flow of air.

On the other hand, the motor control circuit 90 operates and controls the drive motor 110 on the basis of the output signal from the air flow sensor 20, thereby increasing or decreasing rotation of the drive motor 110 in accordance with an increase or decrease in the air drawn into the intake passage 120. Then, this step advances to step S14. With this control, rotation of the axial flow fan 107 is increased or decreased, so that the quantity of air, compressed and discharged to the side of the upstream cylindrical portion 102a by the axial flow turbo fan 107, is increased or decreased.

The quantity of air increased or decreased by the turbocharger 100 is predetermined to sufficiently exceed the flow of air drawn into the engine 30 only by the negative intake pressure under the condition that the turbocharger 100 is not disposed. The air increased or decreased by the turbocharger 100 is supplied to the intake ports 35a to 35d through the intake manifold 62, and is mixed with fuel supplied from the fuel injectors 31a to 31d to the engine 30 so as to produce a fuel-air mixture of the proportion of fuel to air required for perfect combustion. At this time, the air supplied by the turbocharger 100 is in a state of a spiral flow, and therefore the fuel which has injected into the spiral air flow is sufficiently agitated and is uniformly mixed with the air. Thus, the fuel-air mixture can be burned more completely.

As described above, since the turbocharger 100 does not operate during idling, energy is not consumed wastefully. Additionally, since there is no need to set the engine speed of the engine 100 high during idling, useless fuel is not consumed during idling. Additionally, since a sufficient quantity of air for complete combustions is ensured for fuel supplied from the fuel injectors 31a to 31d to the engine 30 except for the period of idling, harmful gas is prevented from being produced when the mixture is burned.

Step S14:

In this step it is judged whether or not the ignition key cylinder is at the ignition (IG) position. If it is at the IG position, this step will return to step S12. On the other hand, if it is not at that position, the control of the turbocharger 100 by the motor control circuit 90 will end.

Synthetic Description of Air Supply Quantity Control and Fuel Injection Control

Figure 9:
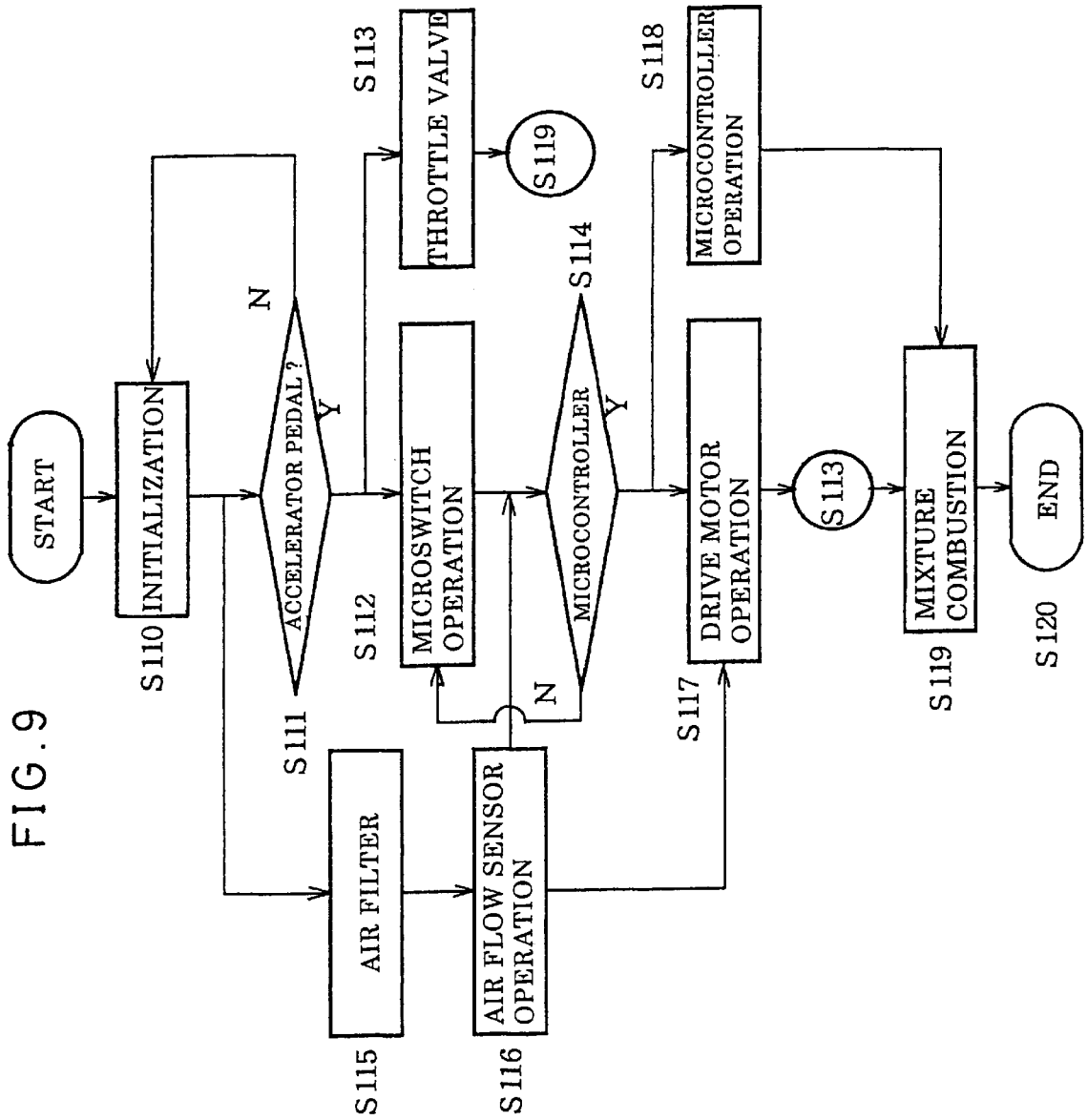
FIG. 9 is a flowchart for explaining the air supply and mixture combustion process according to the present invention.
Figure 10A:
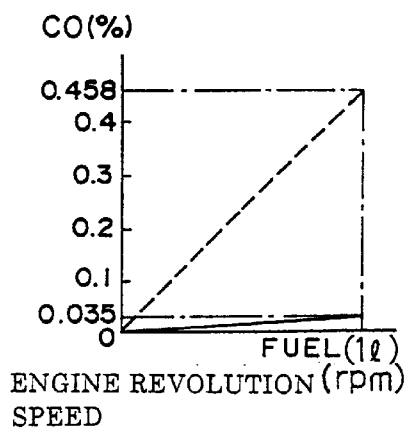
FIGS. 10(A) through 10(E) are explanatory graphs for comparing and analyzing prior art and the present invention by the data measured by experiment.
Figure 10B:
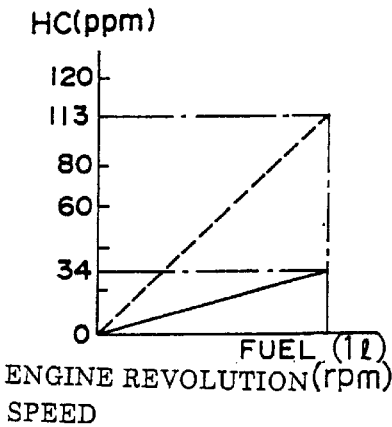
Figure 10C:
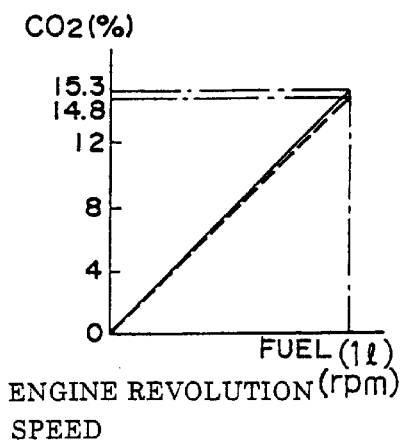
Figure 10D:
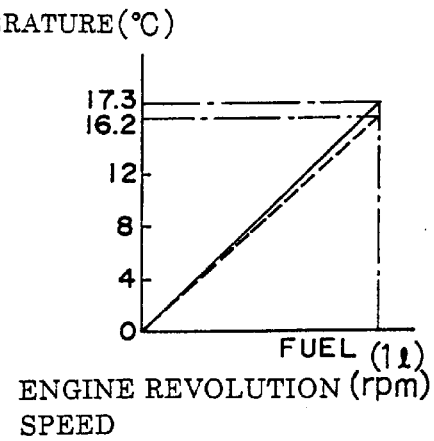
Figure 10E:
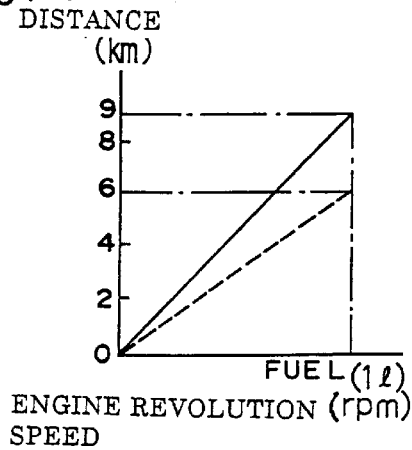

The above-mentioned air supply quantity control and fuel injection control operation will be synthetically described based on FIG. 9.

If the ignition key cylinder is operated and moved to het ACC position, the microcontroller 70 and the motor control circuit 90 will be initialized in step S110. And in this step S110 if the ignition key cylinder is moved to the start position, fuel will be injected from the fuel injectors 31a to 31d to the intake ports 35a to 35d. At the same time, the engine 30 is operated by the starter and step S110 advances steps S111 and S115.

In step S116 the negative pressure produced in the combustion chambers 33a to 33d of the engine 30 acts on the intake passage 120, and with this negative intake pressure, the air in the atmosphere is drawn into the combustion chambers 33a to 33d of the engine 30 through the intake passage 120. When this occurs, dust contained in the air is collected in step S115 with the air filter 10. The purified air passes through the air flow sensor 20, and in step S116 the air flow sensor 20 operates. This air flow sensor 20 detects the quantity of air drawn in and outputs a detection signal corresponding to the detected quantity of air. And the output signal of the air flow sensor 20 is input to the motor control circuit 90 and is also input to the microcontroller 70 through the motor control circuit 90.

In step S111, when the accelerator pedal 50 has not been depressed, this step returns to step S110. If the accelerator pedal 50 is depressed, this step will advance to steps S112 and S113. And if the accelerator pedal 50 is depressed a predetermined quantity or beyond, in step S112 the microswitch 80 will be turned on and this step will advance to step S114.

Also, in step S113 the opening angle of the throttle valve 60 is increased or decreased in accordance with the depressed quantity of the accelerator pedal 50, and this step advances to step S119.

In step S114 the microcontroller 70 judges whether the ON signal from the microswitch 80 has been input. And when the microswitch 80 has not been turned on, step S114 returns to step S112. When the microswitch 80 has been turned on, this step advances to step S117.

In step S117 the motor control circuit 90 operates the drive motor 110 of the turbocharger 100, and this step advances to step S119. At this time, the air flow sensor 20 detects (measures) the intake quantity of air drawn into the intake passage 120 and outputs a signal corresponding to the air intake quantity. This output signal is input to the motor control circuit 90. This motor control circuit 90 increases or decreases rotation of the drive motor 110 in accordance with to an increase or decrease in the air intake quantity, based on the input signal from the air flow snesor 20.

The rotation of the output shaft 110a of this drive motor 110 is transmitted to the axial flow turbo fan 107 through the timing gear 111 and the timing belt 112, so that the axial flow turbo fan 107 is driven to rotate. With this, the axial flow turbo fan 107 compresses the air on the side of the upstream cylindrical portion 102a and discharges the compressed air to the side of the downstream cylindrical portion 110a.

When this occurs, the air on the side of the upstream cylindrical portion 102a flows in a spiral direction by operating of the rectifying plate 104 and is compressed and discharged by the intermediate turbo vanes 108. This discharged air flows in a spiral direction (which is the same direction as the spiral flow produced by the rectifying plates 104) by operation of the rectifying plates 103, and becomes a vortex flow as shown by arrow A in FIG. 5(a), thereby preventing a back flow of air. With this, the pressure due to the vortex flow is produced within the downstream air hose 41 of the axial flow turbo fan 107. This pressure is increased or decreased in accordance with an increase or decrease in the air intake quantity.

In step S118 the motor control circuit 90 inputs the input signal of the air flow sensor 20 to the microcontroller 70. Based on the input signal, the microcontroller 70 causes the fuel injectors 31a to 31d to inject fuel into the intake ports 35a to 35d. This fuel injection quantity is increased or decreased in accordance with (i.e., in proportion to) an increase or decrease in the intake quantity of air drawn into the intake passage 120, and step S118 advances to step S119.

In step S119 the fuel, injected from the fuel injectors 31a to 31d to the intake ports 35a to 35d, is mixed with the air drawn into the intake ports 35a to 35d though the intake passage 120, thereby producing a mixture of fuel and air. After this fuel-air mixture has been drawn into the combustion chambers 33a to 33d of the engine 30, it is ignited and burned by the spark plugs (not shown). After the mixture has burned, it is exhausted into the atmosphere though the exhaust ports 36a to 36d, exhaust manifold 39, etc.

Second Embodiment

In the foregoing embodiment, the number of revolutions of the output shaft of the drive motor 110 is controlled by the motor control circuit 90 on the basis of a detection signal of the air flow sensor 20 and in accordance with an increase or decrease in the intake quantity of air drawn into the intake passage 120. However, the present invention is not limited to this. For example, while the accelerator pedal 50 is being depressed from the start of idling at the actuation of the engine and thereby the microswitch 80 is in an ON state, the drive motor 110 may be operated and controlled to have a fixed number of revolutions on the basis of a signal input to the motor control circuit 90 from the microswitch 80. In other words, except for the time during which the engine 30 is idling, the drive motor 110 may be operated to have a fixed number of revolutions (e.g., 9000 rpm) in spite of the quantity of depression of the accelerator pedal 50, i.e., in spite of an increase in the opening angle of the throttle valve 60.

In this case, the flow quantity of air drawn into the engine 30 when the throttle valve 60 is fully opened is defined as the maximum intake flow quantity, and the quantity of air supplied to the side of the engine 30 by means of the turbo fan 107 is allowed to always exceed the maximum intake flow quantity when the turbo fan 107 actuated by the drive motor 110 is working. Thereby, it is possible to always supply a sufficient quantity of air into the throttle valve 60 and adjust the quantity of air supplied from the throttle valve 60 to the engine 30 so as to obtain a sufficient quantity of air required for burning the fuel.

Figure 13A:
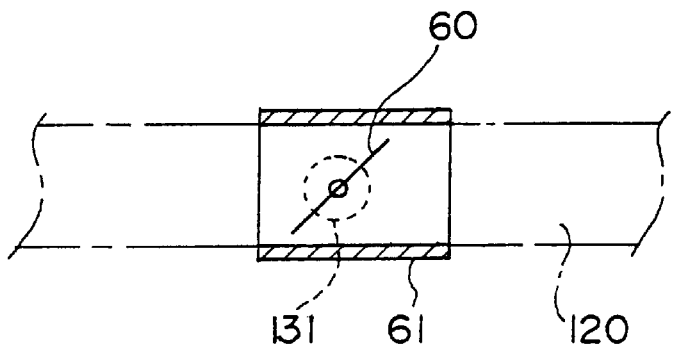
FIG. 13(a) is a sectional plan view showing still another modification of the fuel supply system according to the present invention.
Figure 13B:
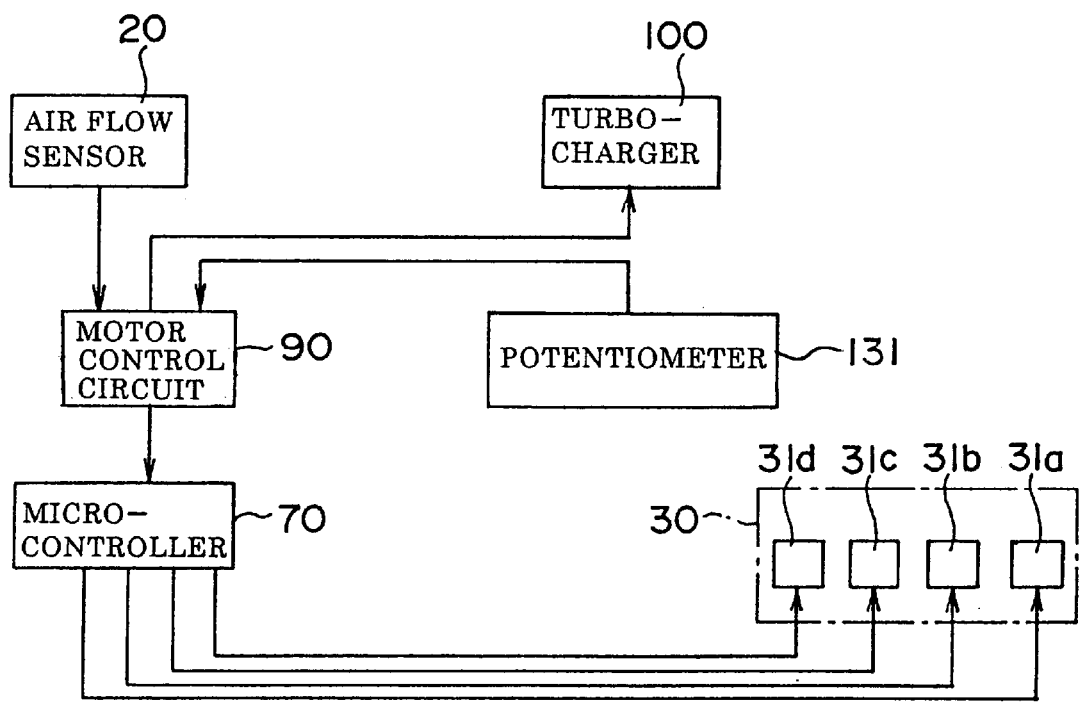
FIG. 13(b) is a block diagram showing the control circuit of the fuel supply system of FIG. 13(a).

At this time, preferably, the quantity of fuel to be injected from the fuel injectors 31a to 31d depends on an increase or decrease in the quantity of depression of the accelerator pedal 50 or, alternatively, an increase or decrease in the opening angle of the throttle valve 60. The detection of the increase or decrease quantity of the opening angle of the throttle valve 60 may be carried out by a potentiometer 131 serving as an opening angle sensor (valve operation detecting means) which is disposed coaxially with the throttle valve 60, as shown in FIG. 13. Instead, the detection of the increase or decrease quantity of the depression of the accelerator pedal 50 may be carried out by a variable resistance serving as an opening angle sensor (valve operation detecting means) which is coupled to the accelerator pedal 50.

The same effects as in the first embodiment can be recited in this embodiment. That is, since the turbocharger 100 does not operate during idling, energy is not consumed wastefully. Additionally, since there is no need to set the engine revolution speed of the engine 100 high during idling, useless fuel is not consumed during the idling. Additionally, since a sufficient quantity of air for complete combustion is ensured for fuel supplied from the fuel injectors 31a to 31d to the engine 30 except for the period of idling, harmful gas is prevented from being produced when the mixture is burned.

First Evaluation Example

FIGS. 10(A) through 10(E) are graphs showing the average values of the measurement results of carbon monoxide, hydrocarbon, carbon dioxide, temperature, and other quantities in the case where a vehicle traveled for 6000 km at an angle revolution speed of 1500 rpm and at a drive-motor revolution speed of 9000 rpm. The data of the measurement results of FIGS. 10(A) through 10(E) at the engine revolution speed of 1500 rpm are shown in Table 1. In Table 1, the travel distance is the distance that a vehicle can cover at an engine revolution speed of 1500 rpm and at a drive-motor revolution speed of 9000 rpm with a fuel of 1 liter. In this evaluation example, a piston displacement of the engine is omitted. However, this evaluation example shows data about a conventional automobile provided with the identical engine to which the fuel supply system of the present invention is applied and is not applied.

TABLE 1

| Inspected items | Measured experimental data | |
|---|---|---|
| | Prior art | Present invention |
| Fuel (1 liter) | 1 | 1 |
| Engine revolution speed (rpm) | 1500 | 1500 |
| Carbon monoxide (CO) (%) | 0.458 | 0.035 |
| Hydrocarbon (HC) (ppm) | 113 | 34 |
| Carbon dioxide (CO$_2$) (%) | 14.8 | 15.3 |
| Temperature (° C.) | 16.2 | 17.3 |
| Travel distance (Km) | 6 | 9 |

From Table 1 and FIGS. 10(A) to 10(E), it has been found that in the present invention, the percentage of carbon monoxide (CO) and percentage of hydrocarbon (HC) harmful to the atmospheric environment and human body are considerably reduced as compared with those of the prior art.

It has also been found that since the travel distance obtained by the present invention is increased as compared with the prior art with the quantity of fuel and the engine revolution speed being the same, the engine combustion efficiency is enhanced as compared with the prior art.

Second Evaluation Example

In the case where a vehicle with a conventional engine of a piston displacement of 1500 cubic centimeters traveled at an engine revolution speed of 1600 rpm by the use of a conventional fuel supply system, the travel distance was 12 km per liter. In contrast, in the case where the vehicle with the identical engine traveled at an engine revolution speed of 1600 rpm and at a drive-motor revolution speed of 9000 rpm by the use of the fuel supply system of the present invention, the travel distance was 18 km per liter. From this, it has been found that, in the case where the 1500 c.c. engine is run at an engine revolution speed of 1600 rpm, the travel distance in the present invention is 6 km longer than that in the prior art. Therefore, the fuel supply system of the present invention is superior in fuel consumption to the prior art system.

Third Embodiment

Figure 11A:
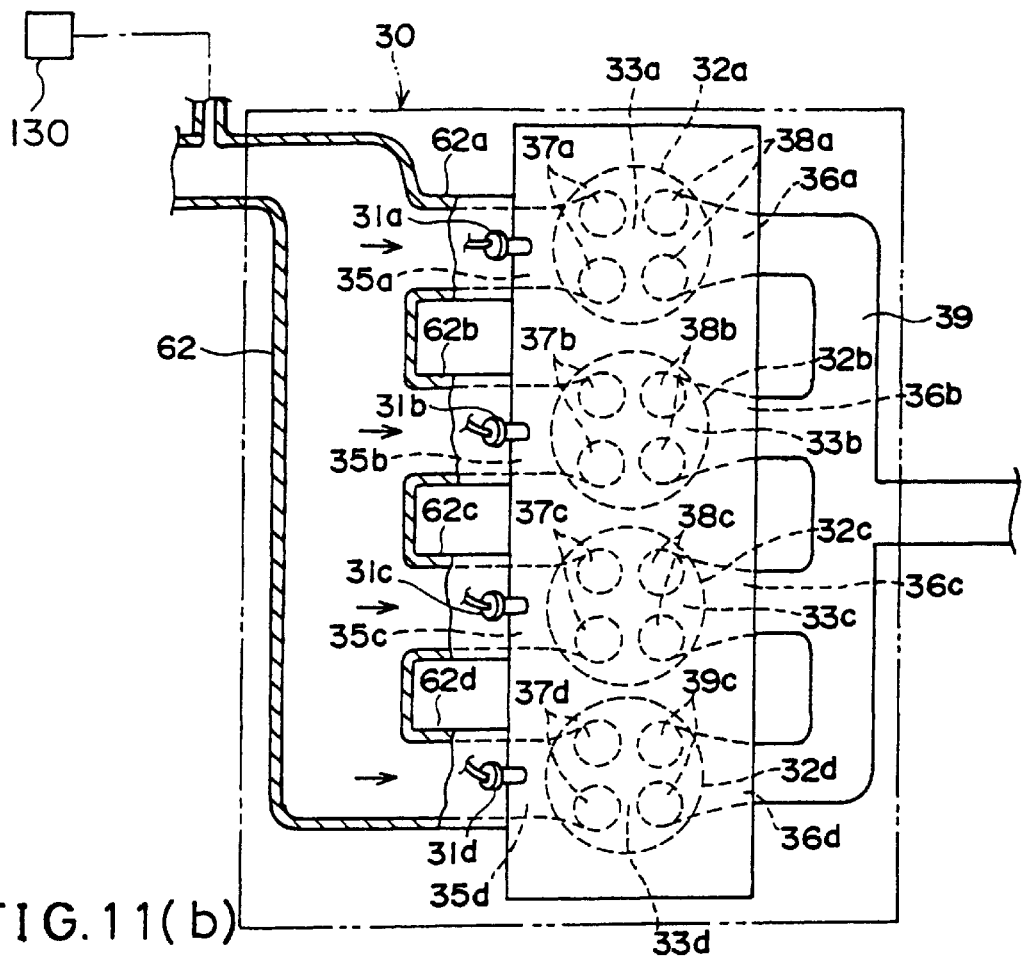
FIG. 11(a) is a sectional plan view showing another modification of the fuel supply system according to the present invention.
Figure 11B:
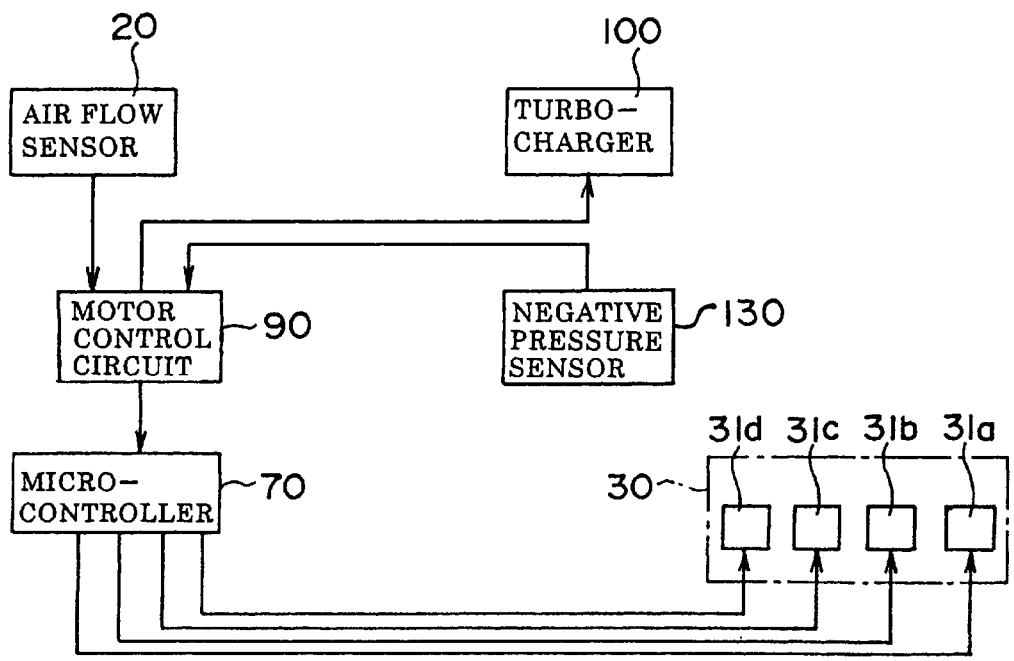
FIG. 11(b) is a block diagram showing the control circuit of the fuel supply system of FIG. 11(a)

In the aforementioned embodiments of the present invention, it has been illustrated and described that the microswitch 80 is employed as a sensor for detecting the opening angle of the throttle valve 60. However, the present invention is not to be limited to this microswitch 80. For instance, as shown in FIG. 11, a negative pressure sensor 130 for detecting the negative intake pressure in the intake manifold 62 may be provided as the opening angle sensor (valve operation detecting means). In this case, the negative pressure sensor 130 detects the negative intake pressure within the intake manifold 62 when the opening angle of the throttle valve 60 has reached a predetermined value or greater, and outputs a detection signal. The detection signal of the negative pressure sensor 130 is input to the motor control circuit 90. And in the same way as the aforementioned embodiments, the drive motor 110 is operated.

Figure 12:
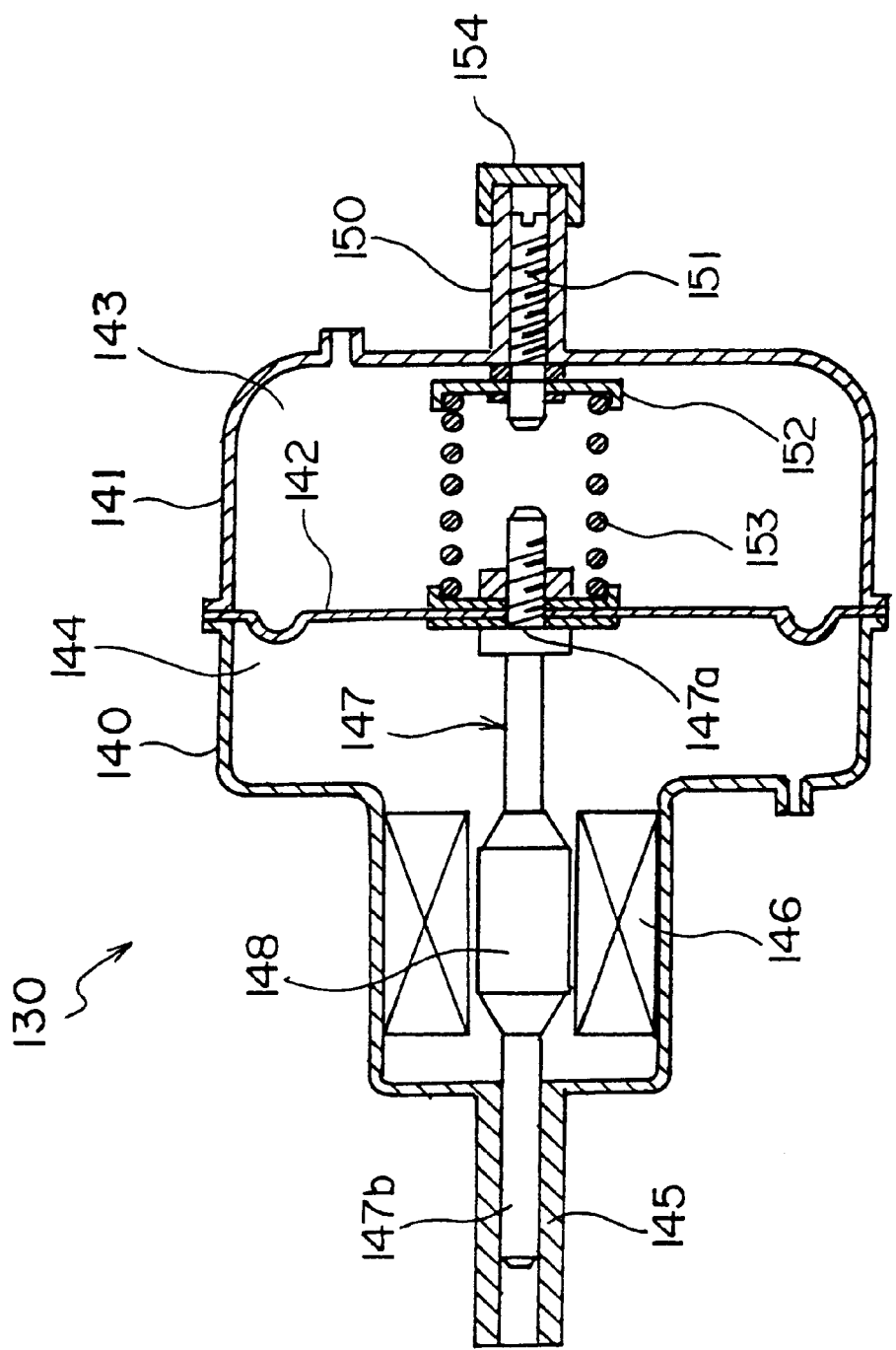
FIG. 12 is a sectional view showing an example of a negative pressure sensor.

FIG. 12 shows the principle of the negative pressure sensor 130. The negative pressure sensor 130 comprises body cases 140, 141 and a diaphragm 142 by which the space defined by the body cases 140, 141 is partitioned off into a negative pressure chamber 143 and an atmosphere chamber 144.

The negative pressure sensor 130 further comprises a bearing sleeve 145 formed in the middle of an end wall of the body case 140, a detection coil 146 disposed in the body case 140 concentrically with the axis of the bearing sleeve 145, a rod 147 an end 147a of which is supported at the center of the diaphragm 142 and the other end 147b is supported in the bearing sleeve 145 so as to be axially movable, and an iron core 148 formed integrally with the rod 147 and disposed in the detection coil 146. The negative pressure chamber 143 communicated with the intake manifold 62 through a communicating hole 141a formed in an end wall thereof.

A bearing sleeve 150 is formed in the middle of the end wall of the body case 141. An adjusting screw 151 is fitted in the bearing sleeve 150 so as to be movable forwards and backwards. A spring bearing 152, which is situated in the negative pressure chamber 143, is attached to an end of the adjusting screw 151, and a compression coil spring 153 is interposed between the spring bearing 152 and the diaphragm 142. The urging force that urges the diaphragm 142 leftwards in FIG. 12 is adjusted by the rightward and leftward movement of the adjusting screw 151. Reference numeral 154 designates a seal cap detachably attached to an end of the bearing sleeve 150.

Accordingly, when the negative intake pressure of the intake manifold 62 acts on the inside of the negative pressure chamber 143, the diaphragm 142 is expanded to the negative pressure chamber 143, and thereby the rod 147 and the iron core 148 are moved to the negative pressure chamber 143 against the spring force of the compression coil spring 153, and are stopped at an equilibrium position where the equilibrium between the negative intake pressure within the negative pressure chamber 143 and the spring fore of the compression coil spring 153 is established. In addition, the detection signal output from the detection coil 146 varies according to the movement of the iron core 148. In other words, this detection signal varies according to the negative intake pressure within the negative pressure chamber 143.

Additionally, since the urging force that urges the diaphragm 142 leftwards in FIG. 12 is controlled by the rightward or leftward movement of the adjusting screw 151, the corresponding relationship between the detection signal output from the detection coil 146 and the negative intake pressure is adjustable. Accordingly, timing for actuating the drive motor 110 is adjustable.

As described above, an increase or decrease in the negative intake pressure of the intake manifold 62 is directly detected, and an increase or decrease in the revolution speed of the drive motor 110 is directly controlled based on a detection signal, and thereby a supply of air by the turbo fan 107 is increased or decreased. That is, the turbo fan 107 accurately controls the quantity of air supplied into the engine 30. In this case, the quantity of air supplied into the engine 30 by means of the axial flow turbo fan 107 can be made larger than the quantity of air drawn into the engine 30 by the negative intake pressure which is caused by running the engine 30. In this case, it is easy to set the quantity of air to be supplied for perfect combustion of fuel injected from the fuel injectors 31a to 31d.

The same effects as in the first and second embodiments can be obtained in this embodiment. That is, since the turbocharger 100 does not operate during idling, energy is not consumed wastefully. Additionally, since there is no need to set the engine revolution speed of the engine 100 high during idling, useless fuel is not consumed during idling. Additionally, since a sufficient quantity of air for complete combustion is ensured for fuel supplied from the fuel injectors 31a to 31d to the engine 30 except for the period of idling, harmful gas is prevented from being produced when the mixture is burned.

Fourth Embodiment

Furthermore, as described above, the potentiometer 131 may be provided as an opening angle sensor coaxially with the throttle valve 60. In this case, the potentiometer 131 detects that the opening angle of the throttle valve 60 has reached a predetermined value or greater, and outputs a detection signal. The detection signal of the potentiometer 131 is input to the motor control circuit 90. And in the same way as in the first embodiment, the drive motor 110 is operated. Alternatively, the quantity of depression of the accelerator pedal 50 may be detected by a detector provided with a variable resistance. A detection signal of the detector is input to the motor control circuit 90, and, in the same way as in the aforementioned embodiments, the drive motor 110 is operated. In these cases, the motor control circuit 90 controls the drive motor 110 such that the revolution speed of the drive motor 110 is increased or decreased in accordance with an increase or decrease in the quantity of depression of the accelerator pedal 50, i.e., an increase or decrease in the opening angle of the throttle valve 60.

Generally, a conventional turbo fan has a construction in which a discharge side fan which is rotated by a discharged air flow from an engine is disposed in a discharge passage whereas an intake side fan which is rotated in accordance with the rotation of the discharge side fan is disposed in an intake passage so as to supply air into the engine by means of the intake side fan in accordance with an increase or decrease in the revolution speed of the engine. However, in this construction, a supply of air into the engine by means of the intake side fan is influenced by the increase or decrease quantity of the discharged air flow. This makes it difficult to accurately and promptly control the supply of air into the engine in accordance with an increase or decrease in the quantity of depression of the accelerator pedal or an increase or decrease in the opening angle of the throttle valve. In other words, the rotation of the intake side fan varies lagging the depressing operation of the accelerator pedal.

However, according to the third embodiment of the present invention, an increase or decrease in the negative intake pressure of the intake manifold 62 is directly detected, or, according to the fourth embodiment of the present invention, an increase or decrease in the quantity of depression of the accelerator pedal 50 or an increase or decrease in the opening angle of the throttle valve 60 is directly detected. Based on these detection signals, an increase or decrease in the revolution speed of the drive motor 110 is directly detected, and thereby the supply of air by means of turbo fan 107 is increased or decreased. Accordingly, it is possible to accurately and promptly control the supply of air into the engine in accordance with an increase or decrease in the quantity of depression of the accelerator pedal or an increase or decrease in the opening angle of het throttle valve. In other words, since air is supplied while accurately corresponding to the depressing operation of the accelerator pedal, a sufficient quantity of air required for complete combustion of fuel can be always promptly supplied.

Additionally, according to the fourth embodiment of the present invention, the revolution speed of the drive motor 110 is increased or decreased in direct conjunction with the depression of the accelerator pedal 50 without undergoing the direct influence of the rotational output of the engine 30, the flow rate of exhaust gas, or the like. In other words, it is excellent in the correspondence to the depressing operation of the accelerator pedal 50.

As described above, the present invention is characterized in that a fuel supply system for an automotive engine comprises: an intake passage for drawing the air in the atmosphere and guiding it to an intake side of the engine; an air flow detecting means for detecting a quantity of the air which is drawn into the intake passage; a turbo means for compressing the air drawn into the intake passage and supplying the compressed air to the engine; a throttle valve arranged in the way of the intake passage; fuel injectors for injecting fuel into the air which is supplied to the engine through the throttle valve; a fuel injection control means for increasing or decreasing a quantity of the fuel which is injected from the fuel injectors in accordance with an increase or decrease in the flow rate of the air which is drawn into the intake passage, based on an output signal from the air flow sensor; a drive motor for driving the turbo means; a valve operation detecting means for detecting an opening angle of the throttle valve when the angle is equal to or greater than a predetermined value and also outputting a detection signal; and a motor control means for driving and controlling the drive motor in response to the detection signal from the valve operation detecting means. Accordingly, it is possible to produce a completely combustible mixture of fuel and air so that fuel economy and engine efficiency can be enhanced and also exhaust gases harmful to the atmospheric environment and human body can be purified, by injecting the quantity of fuel which corresponds to the intake air quantity of the engine during the acceleration and low speed of the automobile.

In addition, since the turbocharger does not operate during idling, energy is not consumed wastefully. Additionally, since there is no need to set the engine revolution speed of the engine high during idling, useless fuel is not consumed during the idling. Additionally, since a sufficient quantity of air for complete combustion is ensured for fuel supplied from the fuel injectors to the engine except for the period of idling, harmful gas is prevented from being produced when the mixture is burned. As a result, high output, low fuel consumption, and low environmental pollution can be realized, by increasing the intake air quantity of the engine. Additionally, the operator can operate with a comfortable atmosphere, by reducing engine noise.

Furthermore, the present invention can be constructed only by incorporating a motor-drive type turbocharger into a conventional automobile. That is, the fuel supply system of the present invention can be easily incorporated into the convention vehicle. Moreover, the invention prevents air from flowing backwards from the engine, by arranging the motor-driven type turbocharger in the way of the air intake passage. With this, the engine combustion efficiency is increased and an enhancement in the fuel consumption can be achieved.

Furthermore, if the motor control means drives and controls the drive motor to maintain a fixed revolution speed while the motor control means is receiving a detection signal from the valve operation detecting means, the drive motor for driving the turbo means can be easily controlled.

Furthermore, if the valve operation detecting means is a microswitch for detecting the depressing operation of an accelerator pedal which is in conjunction with the throttle valve, the fuel supply system of the present invention including the valve operation detecting means can be constructed at low cost.

Furthermore, if the valve operation detecting means is an opening angle detecting sensor for detecting the opening angle of the throttle valve, there is no need to provide another valve operation detecting means when the invention is applied to an automobile provided with a sensor for detecting the opening angle of the throttle valve. Therefore, the fuel supply system of the present invention can be constructed at low cost.

Furthermore, if the valve operation detecting means is a negative pressure detecting sensor for detecting the negative intake pressure of the engine, there is no need to provide another negative pressure detecting means when the invention is applied to an automobile provided with a negative pressure detecting sensor. Therefore, the fuel supply system of the present invention can be constructed at low cost.

Furthermore, if the valve operation detecting means is an opening angle detecting sensor for detecting the opening angle of the throttle valve, and the motor control means increases or decreases the revolution speed of the drive motor in accordance with an increase or decrease in the opening angle of the throttle valve, based on a detection signal from the opening angle detecting sensor when the detection signal from the opening angle detecting sensor is equal to or greater than a predetermined value, the quantity of air supplied to the engine can be controlled accurately in accordance with the revolution speed of the engine.

Furthermore, if the valve operation detecting means is a negative pressure detecting sensor for detecting the negative intake pressure of the engine, and the motor control means increases or decreases the revolution speed of the drive motor in accordance with an increase or decrease in the absolute value of the negative intake pressure, based on a detection signal from the negative pressure detecting sensor when the detection signal from the negative pressure detecting sensor is equal to or greater than a predetermined value, the quantity of air supplied to the engine can be controlled accurately in accordance with the revolution speed of the engine.

Furthermore, if the motor control means increases or decreases the revolution speed of the drive motor in accordance with an increase or decrease in the air intake quantity, based on a detection signal of the air flow detecting means while the valve operation detecting means is detecting the operation of the throttle valve, the quantity of air supplied to the engine can be controlled accurately in accordance with the revolution speed of the engine.

Furthermore, if the turbo means is an axial flow turbo fan provided with rotary vanes for production of a vortex flow, the agitation and mixture of fuel and air to be supplied into the engine are accelerated by the vortical air flow when the fuel is injected to the air, and thereby a uniform fuel-air mixture which is completely combustible is generated.

Furthermore, if the rotary vanes of the axial flow turbo fan are provided so that each vane is set at an angle of 15° to 30° to an axis of the axial flow turbo fan, in order to increase air pressure while producing a vortex flow, and prevent the air from flowing backwards from the engine, a vortex flow by which the agitation and mixture of fuel and air to be supplied into the engine are effectively carried out can be produced.

While the present invention has been fully described with relation to the preferred embodiments thereof, the invention is not to be limited to the details given herein, but may be modified within the scope of the appended claims.

What is claimed is:

1. An air supply system for an automotive engine comprising:
    an intake passage for drawing air in the atmosphere and guiding said air to an intake side of said engine;
    air flow detecting means for detecting a quantity of said air which is drawn into said intake passage;
    turbo means for compressing said air drawn into said intake passage and supplying compressed air to said engine, said turbo means being an axial flow turbo fan provided with rotary vanes for producing a vortex flow, each of said rotary vanes being set at an angle of 15° to 30° to an axis of said axial flow turbo fan for increasing air pressure while producing a vortex flow and for preventing said air from flowing backwards from said engine;
    a drive motor for driving said turbo means;
    valve operation detecting means for detecting an operation of a throttle valve of said engine when an opening angle of said throttle valve is equal to or greater than a predetermined value and for outputting a detection signal; and
    motor control means for driving said drive motor in response to said detection signal from said valve operation detecting means and for controlling said drive motor on the basis of said output signal of said valve operation detecting means.

2. The air supply system for an automotive engine according to claim 1, said system further comprising:
    two groups of stationary vanes disposed on a downstream and an upstream side of said air flow, respectively, each of said stationary vanes being set at an angle of 15° to 30° to said axis of said axial flow turbo fan.

3. An air supply system for an automotive engine comprising:
    an intake passage for drawing air in the atmosphere and guiding said air to an intake side of said engine;
    air flow detecting means for detecting a quantity of said air which is drawn into said intake passage;
    turbo means comprising said air drawn into said intake passage and supplying compressed air to said engine, said turbo means being an axial flow turbo fan provided with rotary vanes for producing a vortex flow, each of said rotary vanes being set at an angle of 15° to 30° to an axis of said axial flow turbo fan for increasing air pressure while producing a vortex flow and for preventing said air from flowing backwards from said engine;
    a throttle valve disposed in said intake passage;
    fuel injectors for injecting fuel into said air which is supplied to said engine through said throttle means;
    fuel injection control means for increasing or decreasing a quality of said fuel which is injected from said fuel injectors in accordance with an increase or decrease in a flow rate of said air which is drawn into said intake passage based on an output signal from said air flow detecting means;
    a drive motor for driving said turbo means;
    valve operation detecting means for detecting an operation of a throttle valve of said engine when an opening angle of said throttle valve is equal to or greater than a predetermined value and for outputting a detection signal; and
    motor control means for driving said drive motor in response to said detection signal from said valve operation detecting means and for controlling said drive motor on the basis of said output signal of said valve operation detecting means.

4. The air supply system for an automatic engine according to claim 3, said system further comprising:
    two groups of stationary vanes disposed on a downstream and an upstream side of said air flow, respectively, each of said stationary vanes being set at an angle of 15° to 30° to said axis of said axial flow turbo fan.

\* \* \* \* \*